United States Patent  
Brown et al.

(10) Patent No.: US 6,646,659 B1
(45) Date of Patent: *Nov. 11, 2003

(54) METHOD, SYSTEM AND PROGRAM FOR SPECIFYING AN ELECTRONIC FOOD MENU WITH FOOD PREFERENCES FROM A UNIVERSALLY ACCESSIBLE DATABASE

(75) Inventors: Michael Wayne Brown, Georgetown, TX (US); Kevin Roderick Lawrence, Round Rock, TX (US); Michael A. Paolini, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/466,051

(22) Filed: Dec. 17, 1999

(51) Int. Cl.[7] .................................................. G09G 5/00
(52) U.S. Cl. ........................ 345/811; 345/745; 705/15; 705/26
(58) Field of Search ................................. 345/810, 811, 345/968, 744, 745, 760; 705/15, 26

(56) References Cited

U.S. PATENT DOCUMENTS

| | | | |
|---|---|---|---|
| 5,412,564 A | | 5/1995 | Ecer |
| 5,559,313 A | | 9/1996 | Claus et al. |
| 5,664,110 A | * | 9/1997 | Green et al. ............ 705/1 |
| 5,727,153 A | * | 3/1998 | Powell .................. 235/375 |
| 5,845,263 A | * | 12/1998 | Camaisa et al. ........... 705/27 |
| 5,899,502 A | * | 5/1999 | Del Giorno ............ 283/117 |
| 5,969,316 A | * | 10/1999 | Greer et al. ............ 235/375 |
| 5,991,739 A | * | 11/1999 | Cupps et al. ............ 705/26 |
| 6,026,377 A | * | 2/2000 | Burke .................... 235/383 |
| 6,047,327 A | * | 4/2000 | Tso et al. ............... 709/202 |
| 6,068,183 A | * | 5/2000 | Freeman et al. ......... 235/375 |
| 6,087,927 A | * | 7/2000 | Battistini et al. ...... 340/286.06 |
| 6,088,681 A | * | 7/2000 | Coleman et al. ........... 705/1 |
| 6,123,259 A | * | 9/2000 | Ogasawara ............. 235/380 |
| 6,129,274 A | * | 10/2000 | Suzuki ................... 235/380 |
| 6,208,976 B1 | * | 3/2001 | Kinebuchi et al. ......... 705/15 |
| 6,236,974 B1 | * | 5/2001 | Kolawa et al. ............ 705/7 |
| 6,246,998 B1 | * | 6/2001 | Matsumori ............... 345/810 |
| 6,301,564 B1 | * | 10/2001 | Halverson ................ 705/15 |
| 6,334,109 B1 | * | 12/2001 | Kanevsky et al. ......... 705/14 |
| 6,366,220 B1 | * | 4/2002 | Elliott .................. 340/10.1 |
| 6,401,034 B1 | * | 6/2002 | Kaplan et al. ........... 340/988 |
| 6,405,034 B1 | * | 6/2002 | Tijerino ................ 455/412 |
| 6,434,530 B1 | * | 8/2002 | Sloane et al. ........... 235/383 |
| 6,553,386 B1 | * | 4/2003 | Alabaster ............. 707/104.1 |

OTHER PUBLICATIONS

QuikOrder Press Release, "San Diegans First to Use Domino's Pizza New On–Line Ordering Through QuikOrder.com", Nov. 1999. (Internet Screen Dumps).*

* cited by examiner

Primary Examiner—Sy D. Luu
(74) Attorney, Agent, or Firm—Marilyn Smith Dawkins; Bracewell & Patterson, L.L.P.

(57) ABSTRACT

Food preferences for a particular customer are requested from a universally accessible database, wherein a key for the particular customer is required to access the food preferences for the particular customer. The food preferences for the particular customer are compared with multiple previously stored food menu items. A food menu comprising only said food menu items that satisfy the food preferences for the particular customer are selected, such that an electronic food menu is specified for a particular customer.

67 Claims, 11 Drawing Sheets

| # | Name | Price | Type of Currency | Desc | Heart Smart | Overall Dietary Daily Values | Ingredients | Amounts and Addl ingred. | Alcohol | Caffeine | Organic/ Free Range | Kosher | Vegan | Dietary Daily Values |
|---|------|-------|------------------|------|-------------|------------------------------|-------------|--------------------------|---------|----------|---------------------|--------|-------|----------------------|
| 1 | Dish 1 | 2.00 | US Dollar | Cup of hot, steamy soup | Yes | Serving Size Calories %Fat %Carbohy-drates %Sodium Vitamins | Water | 4 oz. | No | No | - | - | - | |
|   |   |   |   |   |   |   | Chicken | 1/2 lb. | No | No | Yes | No | No | |
|   |   |   |   |   |   |   | Green chiles | 1 cup | No | No | Yes | - | Yes | |
|   |   |   |   |   |   |   | Salt | 2 tsp | No | No | - | - | - | |
| 1 | Dessert 1 | 5.00 | US Dollar | Hot apples with brandy | No | Serving Size Calories %Fat %Carbohy-drates %Sodium Vitamins | Apples | 1 cup | No | No | Yes | - | Yes | |
|   |   |   |   |   |   |   | Cinnamon | 2 tbs | No | No | - | - | - | |
|   |   |   |   |   |   |   | Sugar | 1/2 cup | No | No | - | - | - | |
|   |   |   |   |   |   |   | Brandy | 1/4 cup | Yes | No | - | - | No | |
| 2 | App 1 | 7.00 | US Dollar | Cheesy dip | No | Serving Size Calories %Fat %Carbohy-drates %Sodium Vitamins | American cheese | 2 cups | No | No | Yes | - | No | |
|   |   |   |   |   |   |   | Tomatoes | 1 cup | No | No | Yes | - | Yes | |
|   |   |   |   |   |   |   | Onions | 1/2 cup | No | No | Yes | - | Yes | |
|   |   |   |   |   |   |   | Cilantro | 1/4 cup | No | No | Yes | - | Yes | |

Fig. 4

| ID | Key | Age | Price Range | Ingred. to avoid | Currency Pref. | Special Inst. | Alcohol | Caffeine | Heart Smart | Organic | Kosher | Protein | Fat | Calories | Security Pref. |
|---|---|---|---|---|---|---|---|---|---|---|---|---|---|---|---|
| 1 | A395 | 24 | 2.00-6.00 | Apples | US Dollars | No burning | - | - | Yes | Yes | - | Less than 10g | Less than 20g | Less than 300 calories | None |
| 905 | 6u8t | 80 | 2.00-20.00 | Lima beans | US Dollars | None | No | No | Yes | - | Yes | More than 10g | Less than 15g | More than 400 calories | Block ID |

METHOD, SYSTEM AND PROGRAM FOR SPECIFYING AN ELECTRONIC FOOD MENU WITH FOOD PREFERENCES FROM A UNIVERSALLY ACCESSIBLE DATABASE

CROSS-RELATED PATENT APPLICATIONS

The present invention is related to the subject matter of the following commonly assigned, copending U.S. patent applications identified as application Ser. Nos. 09/465,999 and 09/466,000. The content of the above-referenced applications is incorporated herein by reference.

BACKGROUND OF THE INVENTION

1. Technical Field

The present invention relates in general to an improved method, system and program for presenting a food menu electronically, and in particular to a method, system and program for efficiently specifying an electronic food menu. Still more particularly, the present invention relates to a method, system and program for specifying an electronic menu for a particular customer from food preferences obtained from a universally accessible database.

2. Description of the Related Art

The global economy has made the business of selling more competitive than ever. Businesses that do not maximize customer satisfaction and profitability will typically not survive in today's markets. Businesses are therefore demanding tools and methods to provide their competitive edge.

In the area of food sales, maximizing customer satisfaction is particularly important to businesses. It is commonly recognized that what and when a person eats has a great impact on a person's overall health and well being. Therefore, in maximizing customer satisfaction, there has been a shift towards providing the customer with menus that provide for customer needs. For example, many menus indicate entrees for heart health conscious customers.

In addition to heart healthy selections, other factors come together for customers selecting from a menu. For example a customer may make menu selections based on personal health reasons such as diabetes, heart disease, food allergies and sensitivity to heart burn. In addition, a recovering alcoholic or one who avoids caffeine may select items that do not include these substances. In another example, a customer may select food based on philosophical reasons, such as selecting foods that are only grown organically. Alternatively, an entrée's assumed aesthetic effect on the body may effect a customer's selection depending on whether the customer is attempting to lose or gain weight. Further, religious reasons may frequently prohibit not only what can be eaten and when, but how the food is prepared.

While there have been efforts to provide more information about food on a menu, it is typically difficult to know what one is eating, when dining out or purchasing preprocessed food. Some menus now include a list of some ingredients and some waiters may know the main ingredients of dish, however finding out a list of every ingredient and preparation thereof is typically not available or there is not an efficient way for the information to be provided. Likewise, requesting actions that deviate from the norm are often miscommunicated enroute to the cooking/preparation staff. For example, requesting that an ingredient, like onions, be removed.

Another difficulty in purchasing food for some can be the way that a menu is provided. For example, seeing-impaired customers typically have difficulty reading a menu in restaurants and other food venues. In addition, when in a foreign country, menus in a language understood by the customer may not be available. Moreover, when in a foreign country converting currency to determine the relative expense of an item in one's typical currency can be time consuming.

Therefore, in view of the aforementioned, it would be preferable to provide a method for customers to easily attain a list of menu items which meet their ordering criteria and menu items which do not meet their ordering criteria. In addition, it would be preferable to provide a method for cooking/preparation staff to receive customer's orders with any special requests in an efficient manner. Further, it would be preferable to provide a method for rendering a menu such it is easily understandable according to a user's preferences.

SUMMARY OF THE INVENTION

In view of the foregoing, it is therefore an object of the present invention to provide an improved method, system and program for presenting a food menu electronically.

It is another object of the present invention to provide a method, system and program for efficiently specifying an electronic food menu.

It is yet another object of the present invention to provide a method, system and program for specifying an electronic menu for a particular customer from food preferences obtained from a universally accessible database.

In accordance with the method, system and program of the present invention, food preferences for a particular customer are requested from a universally accessible database, wherein a key for the particular customer is required to access the food preferences for the particular customer. The food preferences for the particular customer are compared with multiple previously stored food menu items. A food menu comprising only said food menu items that satisfy the food preferences for the particular customer are selected, such that an electronic food menu is specified for a particular customer.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 illustrates a block diagram of a storage structure for food menu items in accordance with the method and system of the present invention;

FIG. 5 depicts a block diagram of a storage structure for a selection of food preferences in accordance with the method and system of the present invention;

DESCRIPTION OF A PREFERRED EMBODIMENT

The present invention may be executed in a variety of systems, including a variety of computers under a number of different operating systems. The computer may be, for example, a personal computer, a personal digital assistant, a network computer, a midrange computer or a mainframe computer. In addition, the computer may be a stand-alone system or part of a network such as a local-area network (LAN) or a wide-area network (WAN). Therefore, in general, the present invention is preferably executed in a computing device that performs computing tasks such as manipulating data in storage that is accessible to the computing device. In addition, the computing device preferably includes at least one output device and at least one input device.

Figure 1:
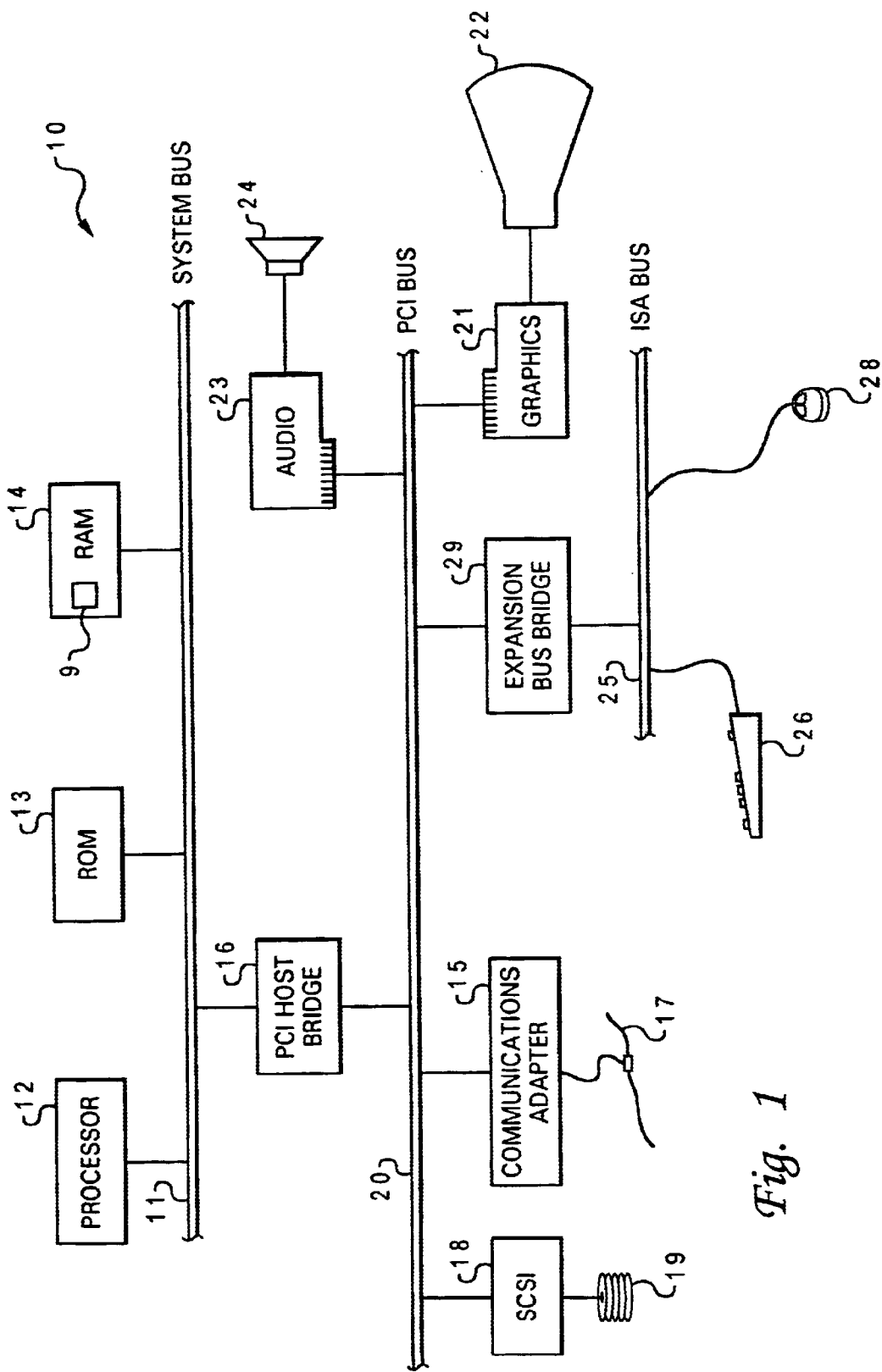
FIG. 1 depicts a block diagram of a typical computer system that may utilize a preferred embodiment of the present invention.

Referring now to the drawings and in particular to FIG. 1, there is depicted a block diagram of a typical computer system that may utilize a preferred embodiment of the present invention. As shown, a processor (CPU) 12, a read-only memory (ROM) 13, and a Random-Access Memory (RAM) 14 are connected to a system bus 11 of a computer system 10. CPU 12, ROM 13, and RAM 14 are also coupled to a PCI local bus 20 of computer system 10 through a PCI host bridge 16. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

Also attaching to PCI local bus 20 are communications adapter 15, small computer system interface (SCSI) 18, and expansion bus bridge 29. In the present embodiment, communications adapter 15 is for connecting computer system 10 to a network 17. In alternate embodiments, communications adapter 15 may provide for communicating via wireless transmissions, including but not limited to, radio frequency (RF) transmissions or infrared transmissions.

SCSI 18 is utilized to control high-speed SCSI disk drive 19. Alternatively, other types of data storage medium may be utilized. Expansion bus bridge 29, such as a PCI-to-ISA bus bridge, may be utilized for coupling ISA bus 25 to PCI local bus 20. As shown, a keyboard 26 and a mouse 28 are attached to ISA bus 25 for performing certain basic I/O functions. In addition, an audio adapter 23 is attached to PCI local bus 20 for controlling audio output through speaker 24. A graphics adapter 21 is also attached to PCI local bus 20 for controlling visual output through display monitor 22. In alternate embodiments of the present invention, additional peripheral components may be added. For example, in alternate embodiments, a tactile display component may be provided.

Computer system 10 also preferably includes an interface such as a graphical user interface (GUI) and an operating system (OS) that reside within machine readable media to direct the operation of computer system 10. Any suitable machine-readable media may retain the GUI and OS, such as RAM 14, ROM 13, SCSI disk drive 19, and other disk and/or tape drive(e.g. magnetic diskette, magnetic tape, CD-ROM, optical disk, or other suitable storage media). Any suitable GUI and OS may direct CPU 12. For example, the AIX operating system is one of IBM's operating systems which may be implemented.

Further, computer system 10 preferably includes at least one software application(e.g. program product) that resides within machine readable media, for example menu specification application 9 in RAM 14. A software application contains instructions that when executed on CPU 12 carry out the operations depicted in the flowcharts of FIGS. 7–10 and others described herein.

Figure 2:
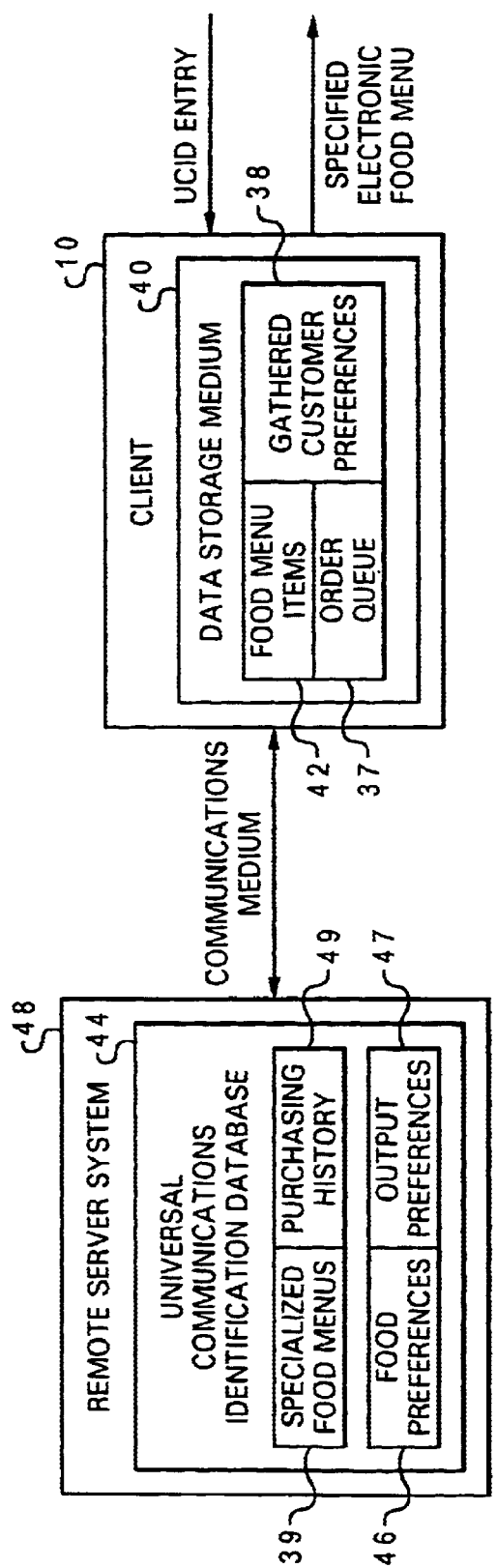
FIG. 2 illustrates a system for selecting an electronic food menu in accordance with the method and system of a preferred embodiment of the present invention.

With reference now to FIG. 2, there is depicted a system for selecting an electronic food menu in accordance with the method and system of a preferred embodiment of the present invention. As depicted, a data storage medium 40 comprises a database of food menu items 42. Preferably the database of food menu items 42 comprises multiple food menu names with descriptions, prices, ingredients, preparation techniques and other food/health data for each food menu item. Data storage medium 40 is preferably accessible by a client system 10. In the present embodiment data storage medium 40 is accessible internally by client system 10, however in alternate embodiments data storage medium 40 may be externally or remotely accessible.

Client system 10 communicates with a remote server system 48 via a communications medium. Communications medium 40 may comprise wireless communications, network communications, a wired connection or other communication media that enables transmission of data to and from client system 10 and remote server system 48. Wireless RF communications are preferably supported by the Bluetooth or other RF transmission specification.

Data exchange across the communications medium is preferably supported by a data transmission protocol such as extensible mark-up language (XML). In addition, a data translation file such as a document type definition (DTD) or schema is preferably provided to validate and translate the XML data. Moreover, a style sheet such as an XSL file is preferably utilized to provide a display specification for the XML data. In addition, a web page or other network graphical interface may be accessed in order to access the XML data. For example, a particular restaurant may provide a web page for accessing the XML encoded data that includes food menu items 42 and other data.

Remote server system 48 may include multiple servers that each include a universal communication identification database (UCID) 44 that is preferably universally accessible. UCID 44 preferably includes stored food preferences 46 that are specified for multiple customers. Food preferences 46 may include a specified price range for meals, ingredients to avoid, preparation preferences, current medications and selections of other food and health criteria such as a preference for heart smart meals. Each customer entry in UCID 44 may be referenced by a customer ID. In addition, for each customer ID, data which is not food related may be stored. Furthermore, other types of data may be stored by alternate ID, such as a food menu stored on UCID 44 by a restaurant ID.

According to a preferred method and system of the preferred embodiment, client system 10 retrieves food preferences 46 for a particular customer from UCID 44. To retrieve food preferences 46 for a particular customer, a key entry is supplied to client 10 specifying the customer ID and preferably an access key. The customer ID, access key and a request for food preferences 46 are transmitted to remote server system 48 via a communications medium. Remote server system 48 looks up the customer ID in UCID 44 and retrieves the requested food preferences if available. Remote server system 48 then transmits the requested food preferences to client system 10. Client system 10 compares food menu items 42 with food preferences 46, and specifies a food menu wherein those food menu items 42 which satisfy food preferences 46 are designated. Client system 10 then outputs the specified electronic food menu.

In an alternate embodiment (not shown), food menu items 42 may also be stored in UCID 44. In this embodiment, a customer ID and key and a particular food menu are selected in UCID 44. Remote server system 48 compares food menu items 42 with food preferences 46 and specifies a food menu wherein those food menu items 42 which satisfy food preferences are designated. Remote server system 48 outputs the specified electronic food menu. By the alternate embodiment, multiple food menus stored in UCID 44 may be compared to food menu items 42 in a menu request.

The specified electronic food menu may be output to multiple peripherals. Examples of peripherals may include, but are not limited to a graphical display, an audio format, a tactile-detectable format, or a printed copy. In addition, client system 10 may include output preferences 47 that are specified for a single user or multiple users. Output preferences 47 may include, but are not limited to specifications such as the size of font in a graphical display, the type of tactile-detectable output (e.g. Braille), the language, or the currency. The specified electronic food menu is preferably output in accordance with any output preferences 47.

In addition, the values displayed for the specified electronic food menu may be rendered in multiple formats according to output preferences 47. For example, only those food menu items that are designated may be displayed. Alternatively, all food menu items are displayed, but those food menu items that are not selected are indicated by a flag. Alternatively, food menu items are displayed in a sequential format where the best selection is displayed first and the worst selected displayed last. In addition, alternative coloring and highlights may be utilized to distinguish food menu items. For example, all food menu items that are designated are highlighted in bright green and those food menu items that are not designated are highlighted in bright red. Moreover, additional information about ingredients and other food and health related data may be available if selected by the customer.

The specified electronic food menu may include designations of daily specials, such as the Monday special. In addition to graphically distinguishing specials, daily specials may be automatically added to an electronic calendar stored with the customer ID at UCID 44. In the example of the Monday special, an electronic calendar can provide a reminder of the Monday special each Monday. Moreover, along with food menu items 42, coupon items and special offers may be transmitted with food menu items 42. For example, a coupon that is available for use during that restaurant visit or another may be transmitted with food menu items 42. If not utilized during that visit, the coupon can be stored and utilized for a subsequent visit. Coupons may be filtered based on food preferences 46, such as an age-related coupon. Alternatively, calendar based coupons may be transmitted with the food menu items. For example, a coupon that can be utilized on a particular Thursday when four or more dine may be transmitted with the food menu items and added to an electronic calendar at the customer ID.

Client system 10 may receive input designating an order from a particular customer from the specified electronic food menu. Client system 10 then attaches any food preparation preferences that are designated in food preferences 46 and transmits the food order to data storage medium 40. Data storage medium 40 preferably includes an order queue 37 into which the customer order is placed in order received and sent to the kitchen. Alternatively, order queue 37 may be included within an alternate data storage medium.

After displaying the specified electronic food menu, client system 10 may receive input designating an order from the particular customer from the specified electronic food menu. In addition, the customer may designate a credit card number or other electronic money payment method. Client system 10 transmits the electronic money payment data to remote server system 48 or another payment controller. Remote servers system 48 requests validation of the electronic money payment, as is well known in the art. If approved, client system 10 attaches any food preparation preferences that are designated in food preferences 46 and transmits the food order to an order queue 37 wherefrom a kitchen staff can access the order. The order queue may adjust waiting for orders by individual food preferences, group food preferences and other criteria. For example, the order queue may adjust waiting for orders based on the frequency that a customer orders from the restaurant. While in the present embodiment order queue 37 is included in data storage medium 40, in alternate embodiments, order queue 37 may be externally or remotely accessible by data storage medium 40 or stored in an alternate data storage medium.

Data storage medium 40 is preferably enabled to retrieve and store customer food preferences in a customer preference database 38. By gathering food preferences of customers ordering from a menu, a restaurant may utilize the data to adjust their menu to meet customer needs and preferences. Moreover, in knowing customer preferences, coupons and food menu items that are transmitted to the customer may be customized. For example, if a particular customer always orders two drinks, two sandwiches and two cookies, a special coupon may be transmitted to client system 10 for that particular customer that gives a discount for ordering two drinks, two sandwiches and two cookies. In another example, the number of coffees a particular customer has purchased at a coffee shop may be recorded such that on the $10^{th}$ cup the customer receives a free coffee.

Figure 3:
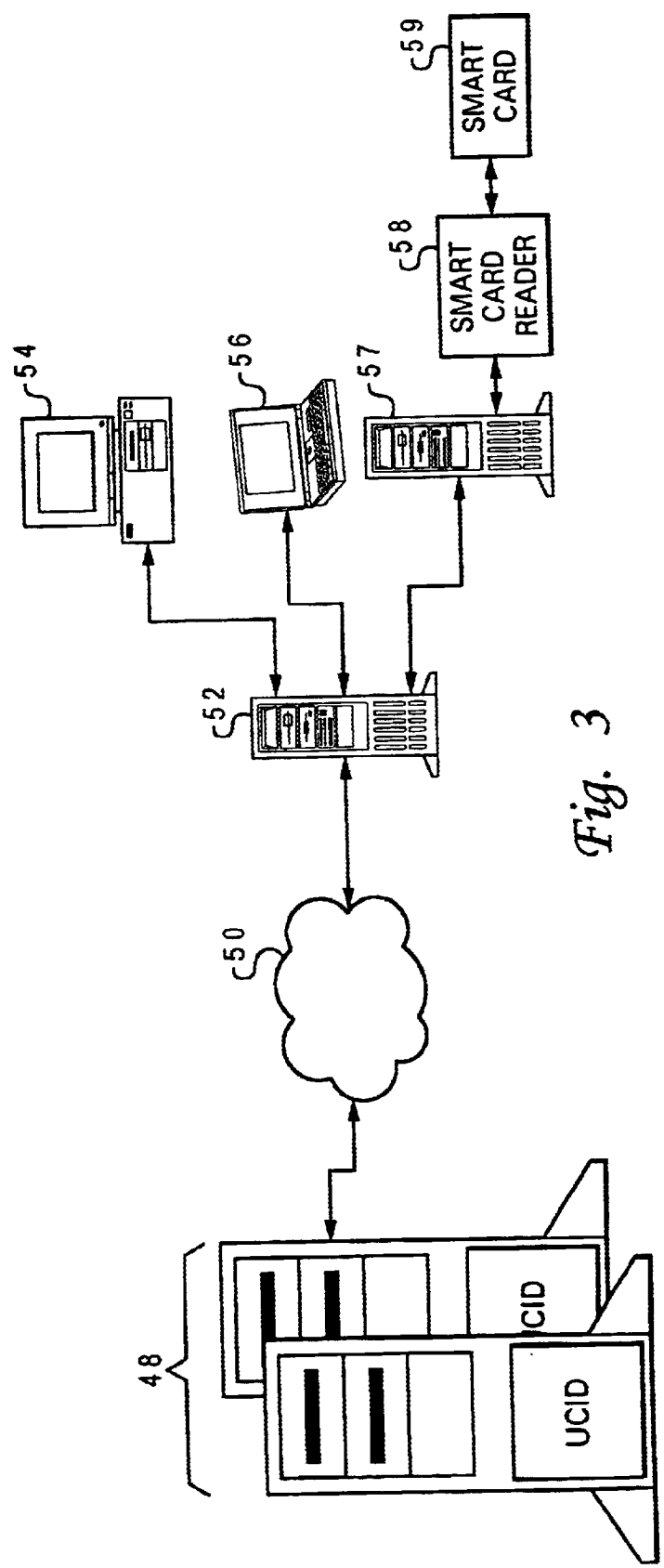
FIG. 3 depicts multiple types of computer systems which may be utilized to specify an electronic food menu in accordance with the method an system of the present invention.

Referring now to FIG. 3, there are illustrated multiple types of computer systems which may be utilized to specify an electronic food menu in accordance with the method an system of the present invention. Multiple types of computer systems can retrieve data from and transmit data to UCID 44 via a communications link with remote server system 48. Examples of computer systems include, but are not limited to, a desktop computer 54, a pervasive device such as a portable computer system 56, and a server 57. An example of a communications link includes, but is not limited to, a network 50 accessible by a network server 52 that is accessible by a client system. Network cloud 50 may comprise a network such as the Internet, which is well known in the art. Network server 52 may include multiple servers.

A customer ID and access key may be provided to a client system via a personal integrated circuit device. In the example depicted, a smart card reader 58 is accessible by server 57. Smart card reader 58 accesses a smart card 59 that preferably includes a customer ID and an access key. While the example depicted utilizes smart card 59 as a personal integrated circuit device, alternate types of personal integrated circuit devices which include customer ID data may be utilized in the present invention as will be understood by one well known in the art. In addition, a user may enter a customer ID and key through an alternate peripheral device.

With reference now to FIG. 4, there is illustrated a block diagram of a storage structure for food menu items in accordance with the present invention. As depicted, the food menu items corresponding to a menus from restaurants "1" and "2" are preferably stored in a data storage structure such as database 60. The example database 60 is provided in order to depict a selection of fields 62 which may be included in a data storage structure. For the purposes of example, food menu items have been entered for rows 64, 66 and 68. In alternate embodiments, alternate selections of fields for defining food and health data for food menu items may be utilized. In addition, alternate types of data storage structures and methods may be utilized. Further, while not depicted, a graphical interface for entering a selection of fields 62 and food menu items is preferably provided.

As depicted in FIG. 4, fields 62 include multiple fields. For example, a menu number field designates to which menu an item belongs such that multiple menus may be included within a single data storage structure. Next, an item name field provides the name of an item. A price field provides the price of the item. A type of currency field designates the currency that the price is list in. A description field may provide a textual description of the menu item. Fields such as the heart smart field designate overall ratings of the food menu item. An overall dietary daily values field includes a breakdown of the serving size, calories, fat contents, carbohydrates, protein, sodium, vitamins and other dietary values. An ingredients field provides a list of all ingredients utilized in the preparation of a menu item. In addition, the amounts of each ingredient are designated. Further, additional ingredients making up each ingredient may be included. For example, the ingredients that are utilized to produce brandy may be listed. Additionally, fields are included for designating whether or not an ingredient contains alcohol or caffeine, utilizes organically grown and/or free range products, is prepared kosher or is a vegan-friendly ingredient. Additional ratings fields for each ingredient may be provided.

Referring now to FIG. 5, there is depicted a block diagram of a storage structure for a selection of food preferences in accordance with the present invention. As illustrated, the data corresponding to a selection of food preferences is preferably stored in a data storage structure such as database 80. The example database 80 is provided in order to depict a selection of fields 72 which may be included in a data storage structure. For the purposes of example, food preferences have been entered for rows 74 and 76. In alternate embodiments, alternate selections of fields for food preferences may be utilized. In addition, alternate types of data storage structures and methods may be utilized. Further, while not depicted, a graphical interface for entering a selection of fields 72 and food preferences is preferably provided by computer system 10.

As illustrated in FIG. 5, fields 72 include multiple fields that are utilized for filtering a food menu. For example, a user field designates the user of the specifications for a row such that preferences for multiple users may be included. Next, age field designates the age of each user. The age of the user may be automatically incremented from the user's birthdate. The price range field includes price range limits. Price range limits may be set by the user, or may be set automatically by a money management application that tracks the customer's available resources and budgetary constraints. Alternatively, a user may designate a particular price range of breakfasts, lunches and dinners. In addition, the user may designate a particular price range depending on who the user is dining with. A currency preference field designates in which currency the user would prefer to see prices listed.

Food and health preferences of the user are also included in field 72. Ingredients to avoid field includes ingredients which the suer does not want included. Preparation preferences field designates any preparation preferences that the user desires. Health rating preferences field includes multiple fields including alcohol preference, caffeine preference, heart smart meal preference, organic product preference, kosher preparation preference, protein preference, fat preference, calorie preference. Protein preference, fat preferences and calorie preference may be fields that are set by the user or alternatively may be set by a food monitoring program that controls the amount of protein, fat and calories that a user consumes daily. Further a special instructions fields may include other special instructions that the user designates.

Figure 6A:
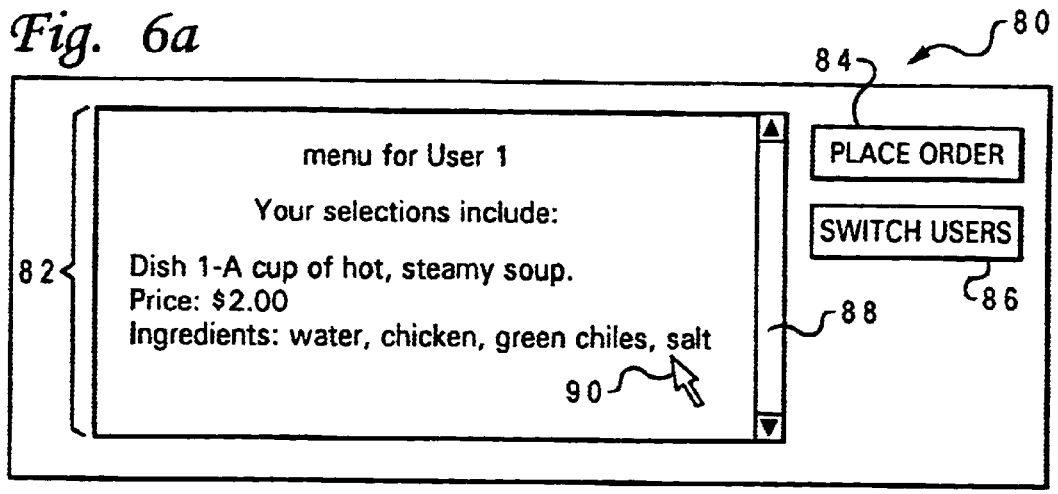
FIG. 6 illustrates a graphical representation of a specialized electronic food menu in accordance with the method and system of the present invention.
Figure 6B:
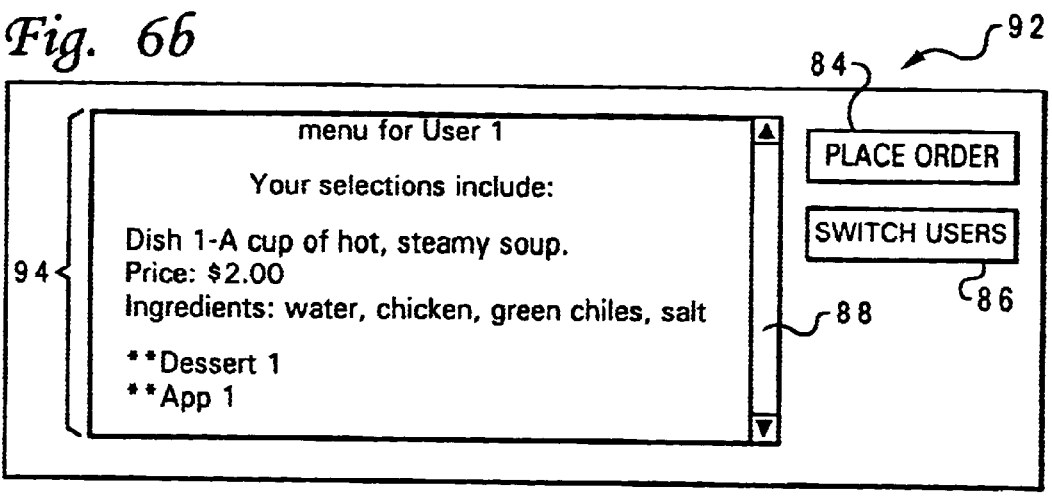
Figure 6C:
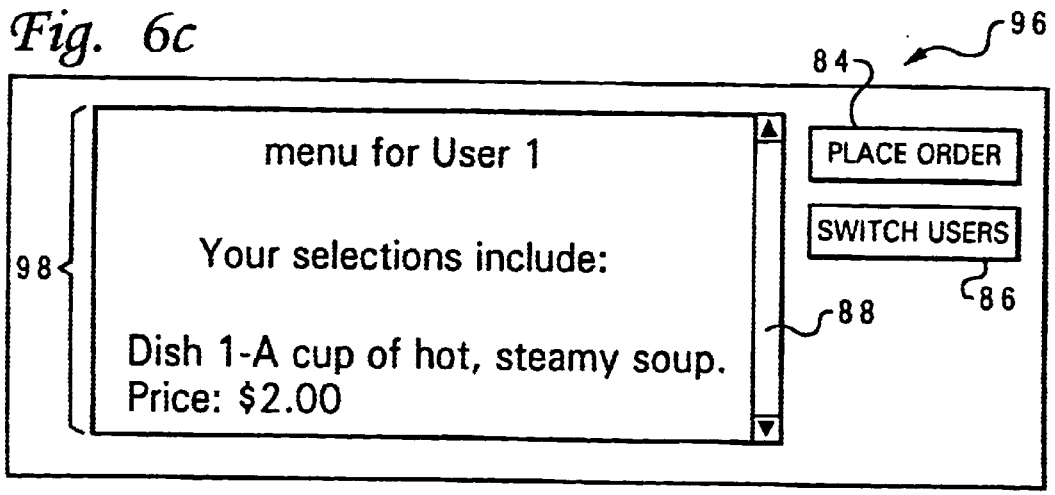

With reference now to FIGS. 6a–6c, there is depicted a graphical representation of a specialized electronic food menu according the method and system of a preferred embodiment of the present invention. In the examples, the specialized electronic food menu is determined by food preferences for user 1. Food preferences for user 1 are depicted at row 74 of FIG. 5 and have preferably been previously stored in a manner that is accessible to computer system 10. In comparing the food menu items illustrated at rows 64 and 66 of FIG. 4 with the user preferences for user 1, "Dish 1" is selected from the menu items.

Referring to FIG. 6a, a graphical display 80 includes a graphical representation 82 of a specialized electronic food menu, wherein graphical representation 82 depicts only the menu items that are selected. In the present example, only Dish 1 meets the customer's food preferences. With reference to FIG. 6b, a graphical display 92 includes a graphical representation 94 of a specialized electronic food menu, wherein graphical representation 94 illustrates all the menu items, however the menu items that are not selected are flagged. In the example, Dessert 1 and App 1 are flagged as not meeting the customer's food preferences. In addition, a description and price of the flagged items is not included. However, in alternate embodiments, the description and price of flagged items may be included. Referring to FIG. 6c, a graphical display 96 includes a graphical representation 98 of a specialized electronic food menu. In the example, an output preferences for user 1 specifies output in a large font size. Therefore, graphical representation 98 illustrates the specialized menu at a particular large font size. Preferably, the user can specify a font size or a range of font sizes for the text of a specialized food menu.

In both embodiments depicted, a user may select the scroll bar 88 in order to scroll through the menu for user 1 utilizing pointing indicator 90. In addition, the user may select from buttons 84 and 86 to perform functions such as placing an order or switching user preferences. In alternate embodiments, alternate types of graphical displays may be provided. In addition, the display is preferably adjusted according to any user display preferences, as previously described. Further, as previously described, while a graphical representation of a specialized electronic food menu is displayed utilizing one rendering method, other rendering methods may be utilized.

Figure 7A:
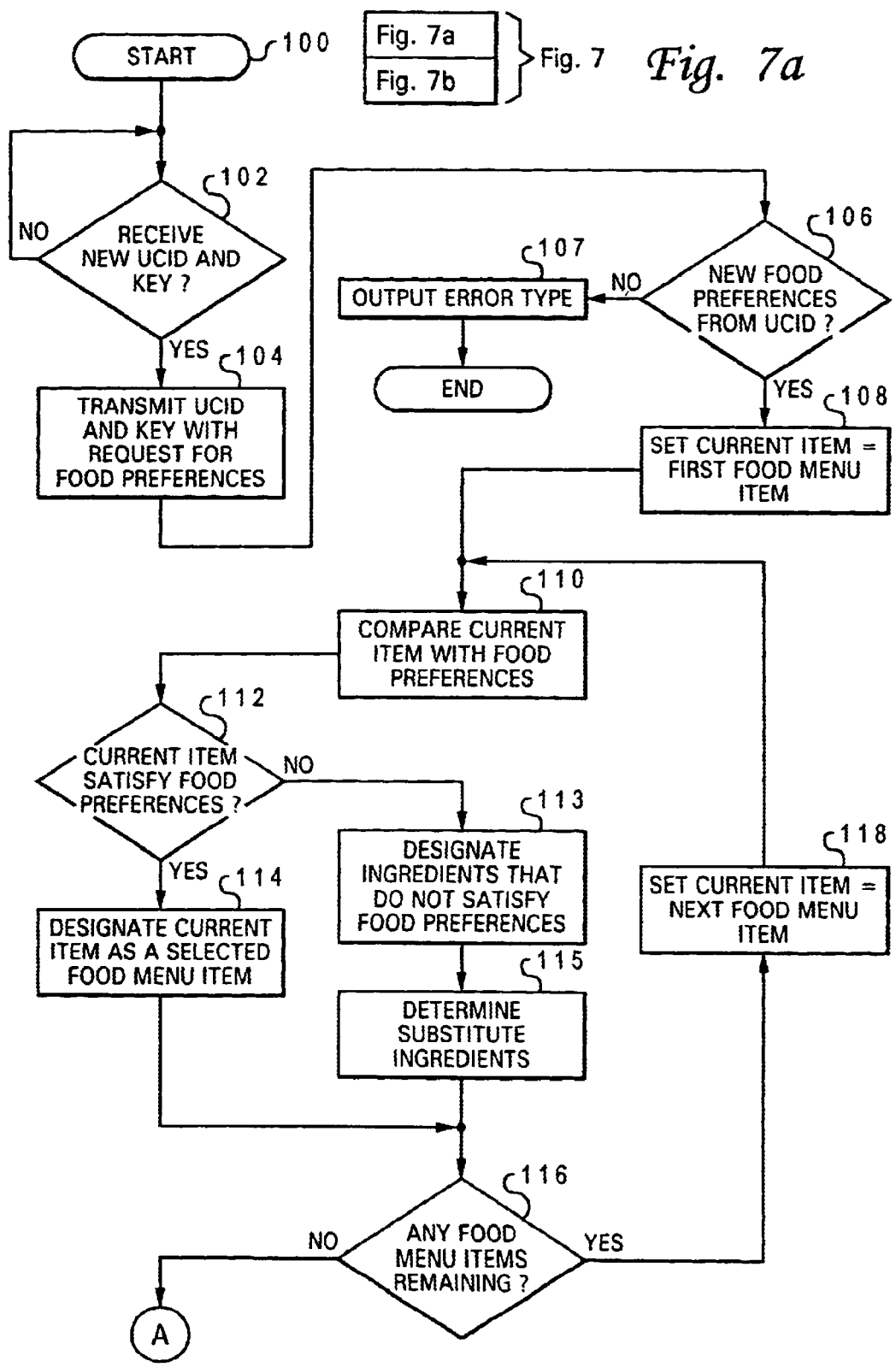
FIG. 7 depicts a high level logic flowchart of a process for specializing an electronic food menu for a particular customer in accordance with the method and system of the present invention.
Figure 76:
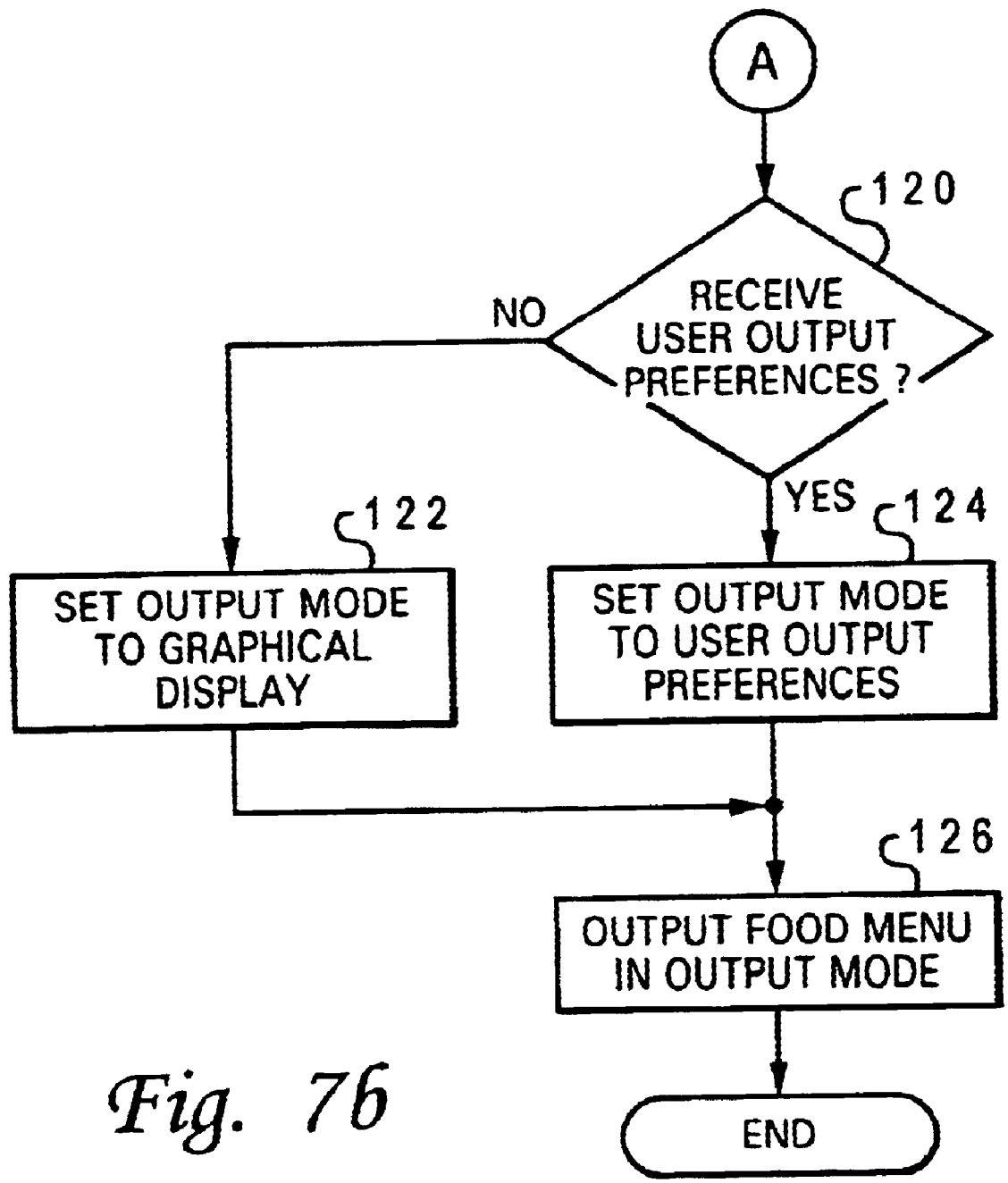

Referring now to FIG. 7, there is illustrated a high level logic flowchart of a process for specializing an electronic food menu for a particular customer in accordance with the method and system of the present invention. As depicted, the process starts at block 100 and thereafter proceeds to block 102. Block 102 illustrates a determination as to whether a customer ID and key are received. If a customer ID and key are not received, the process iterates at block 102. If a customer ID and key are received, the process passes to block 104. Block 104 depicts transmitting the customer ID, key and a request for food preferences to a UCID. Thereafter, block 106 illustrates a determination as to whether food preferences from the UCID are received. If food preferences have not been received, the process passes to block 107. Block 107 depicts a determination as to whether an error is received. If an error is received, the process ends. If an error is not received, the process passes to block 106.

Returning to block 106, if food preferences are received, the process passes to block 108. Block 108 illustrates setting the current item to the first food menu item. Next, block 110 depicts comparing the current item with the food preferences. Thereafter, block 112 illustrates a determination as to whether the current item satisfies the food preferences. If the current item does not satisfy the food preferences, the process passes to block 116. If the current item does satisfy the food preferences, the process passes to block 114. Block 114 depicts designating the current item as a selected food menu item. Thereafter, the process passes to block 116. Block 116 illustrates a determination as to whether any food menu items are remaining. If no food menu items remain, the process passes to block 120. If any food menu items remain, the process passes to block 118. Block 118 depicts setting the current item to the next food menu item.

Block 120 depicts a determination as to whether any output preferences are received. If no output preferences are received, the process passes to block 122. Block 122 illustrates setting the output mode to a graphical display output. If output preferences are received, the process passes to block 124. Block 124 depicts setting the output mode to the output preferences. Thereafter, block 126 illustrates outputting the specified electronic food menu in the output mode. Next, the process ends.

Figure 8:
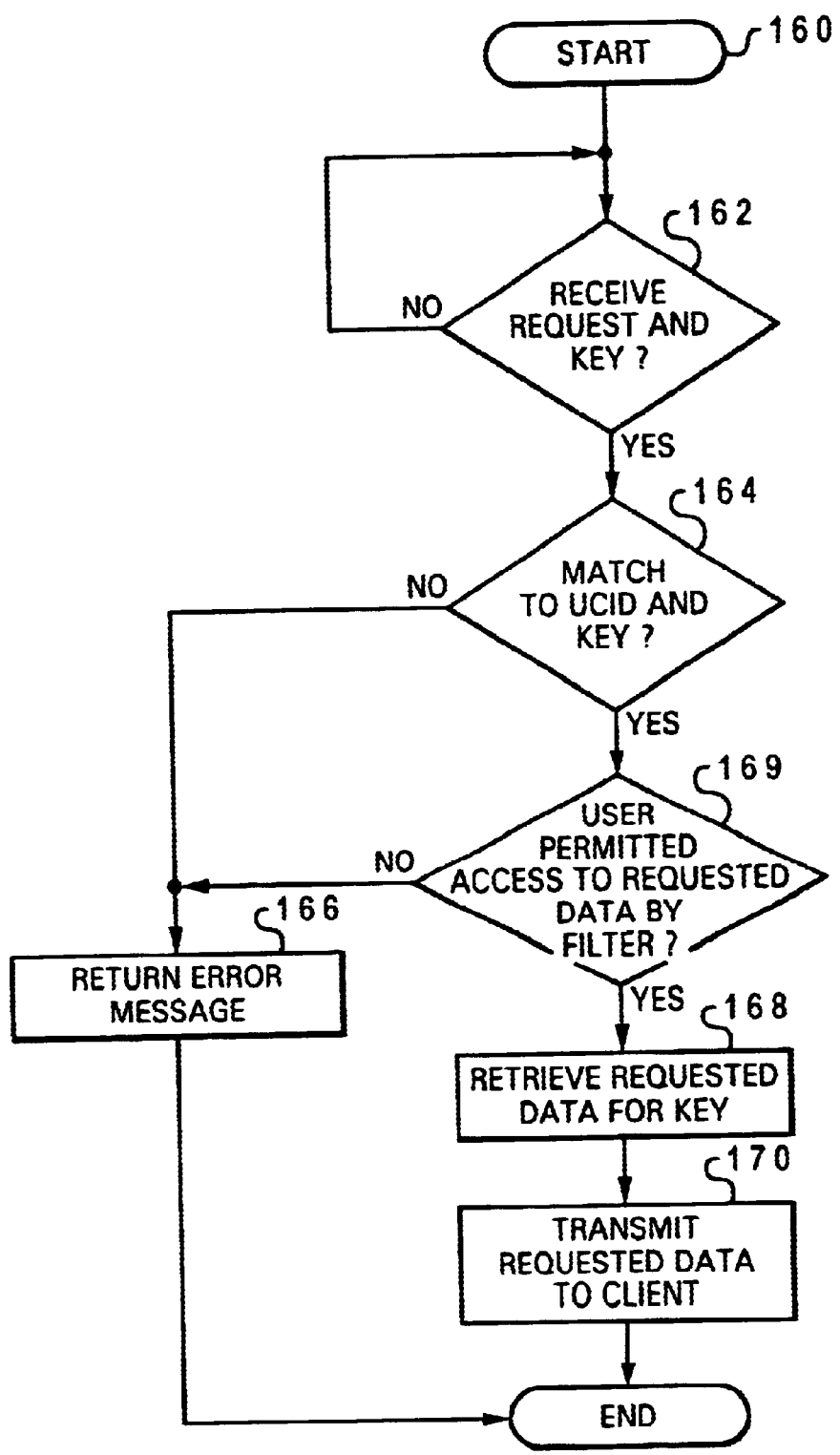
FIG. 8 illustrates a high level logic flowchart of a process for retrieving food preferences for a particular customer in accordance with the method and system of the present invention.

With reference now to FIG. 8, there is depicted a high level logic flowchart of a process for retrieving food preferences for a particular customer in accordance with the method and system of the present invention. As illustrated, the process starts at block 160 and thereafter proceeds to block 162. Block 162 illustrates a determination as to whether a request, customer ID and key are received. If a request, customer ID and key are not received, the process iterates at block 162. If a request, customer ID and key are received, the process passes to block 164. Block 164 depicts a determination as to whether a match to the customer ID and key are found. If a match is not found, the process passes to block 166. Block 166 illustrates returning an error message and thereafter the process ends. If a match for the customer ID and key is found, the process passes to block 138. Block 138 illustrates retrieving the requested data for the customer ID from the UCID. Thereafter, block 140 depicts transmitting the requested data to the requesting client. Next, the process ends.

Figure 9:
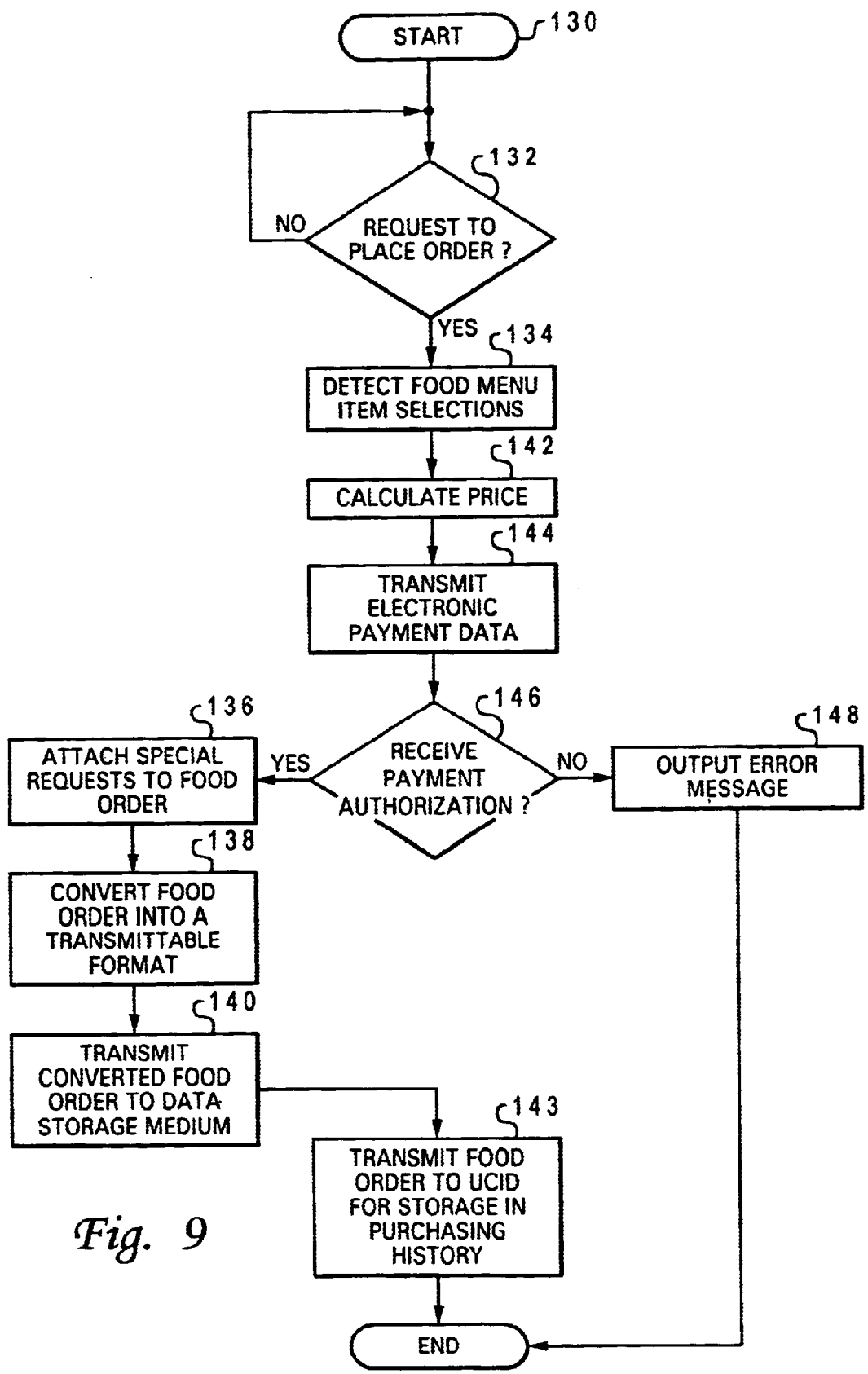
FIG. 9 depicts a high level logic flowchart of a process for placing a food order in accordance with the method and system of the present invention.

With reference now to FIG. 9, there is depicted a high level logic flowchart of a process for placing a food order. As illustrated, the process starts at block 130 and thereafter proceeds to block 132. Block 132 depicts a determination as to whether a request to place an order is made. If a request to place an order is not made, the process iterates at block 132. If a request to place an order is made, the process passes to block 134. Block 134 illustrates detecting food menu items that are selected by the user. Next, block 142 depicts calculating a price for the order with adjustment for any electronic coupons being redeemed. Thereafter, block 144 illustrates transmitting electronic payment data. Next, block 146 depicts a determination as to whether payment authorization is received. If payment authorization is not received, the process passes to block 148. Block 148 illustrates outputting an error message and then the process ends. If payment authorization is received, the process passes to block 136.

Block 136 depicts attaching special requests to the food menu items selected by the user. Thereafter, block 138 illustrates converting the food menu items selected by the user into a transmittable format. Next, block 140 depicts transmitting the converted food menu items selected by the user to an order queue of a data storage medium. Thereafter, the process ends. While one embodiment of a process for placing a food order is depicted, alternate processes may be utilized for placing food orders wherein users select from the specialized electronic food menu and that selection is transmitted to an order queue or other order system.

Figure 10:
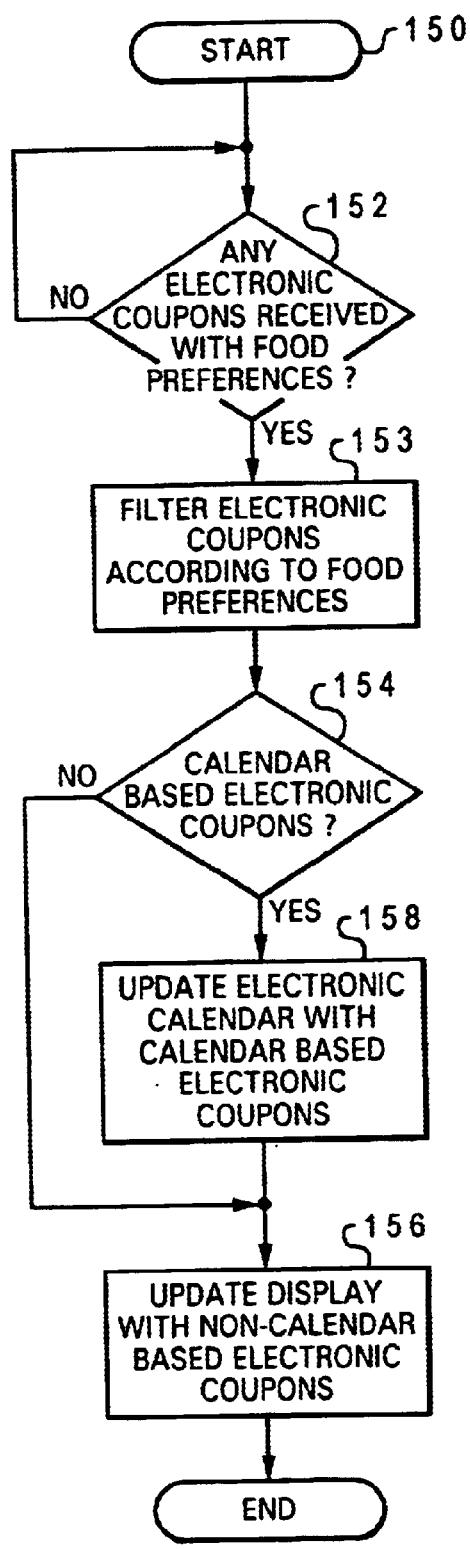
FIG. 10 illustrates a high level logic flowchart of a process for presenting electronic coupons

Referring now to FIG. 10, there is illustrated a high level logic flowchart of a process for presenting electronic coupons. As depicted, the process starts at block 150 and thereafter proceeds to block 152. Block 152 illustrates a determination as to whether any electronic coupons are received with the food menu items. Thereafter, block 153 depicts filtering the electronic coupons according to food preferences. Next, block 154 illustrates a determination as to whether any calendar based electronic coupons are received. If calendar based electronic coupons are received, the process passes to block 158. Block 158 depicts updating an electronic calendar with the calendar based electronic coupons and the process passes to block 156. Block 156 illustrates updating the graphical display with any non-calendar based electronic coupons and the process ends.

In the present invention, a client system receives food preferences for a particular customer from a UCID and selects a specified electronic food menu. However, in alternate embodiments of the present invention, the remote server system may retrieve the food preferences for a particular customer and for a particular food menu, wherein the remote server system selects a specified electronic food menu that is transmitted to the client system.

It is important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for specifying an electronic food menu, said method comprising the steps of:

retrieving food preferences for a particular customer from a universally accessible database, wherein a key for said particular customer is required to access said food preferences for said particular customer;

comparing said food preferences for a particular customer with a plurality of previously stored food menu items;

presenting a food menu wherein a plurality of food menu items that satisfy said food preferences for said particular customer are designated on said electronic food menu, such that, an electronic food menu is specified for said particular customer; and graphically displaying said electronic food menu, wherein a plurality of food menu items that do not satisfy said food preferences for said particular customer are graphically distinguishable from said plurality of food menu items that do satisfy said food preferences for said particular customer.

2. The method for specifying an electronic food menu according to claim 1, said method further comprising the step of:

graphically displaying said electronic food menu according to a output preference for said particular customer, such that the graphical representation of said electronic food menu is provided to accommodate a display preference for said particular customer.

3. The method for specifying an electronic food menu according to claim 2, said step of graphically displaying said electronic food menu further comprising the step of:

graphically displaying only said plurality of food menu items of said electronic food menu that are designated.

4. The method for specifying an electronic food menu according to claim 2, said step of graphically displaying said electronic food menu further comprising the step of:

graphically displaying said electronic food menu in order from designated food menu items to non-designated food menu items.

5. The method for specifying an electronic food menu according to claim 2, said step of graphically displaying said electronic food menu further comprising the step of:

graphically displaying a tactile-detectable graphical representation of said electronic food menu, wherein said output preference for said particular customer designates a tactile-detectable graphical representation.

6. The method for specifying an electronic food menu according to claim 2, said step of graphically displaying said electronic food menu further comprising the step of:

graphically displaying a graphical representation of said electronic food menu utilizing a particular font size, wherein said output preference for said particular customer designates said particular font size.

7. The method for specifying an electronic food menu according to claim 2, said step of graphically displaying said electronic food menu further comprising the step of:

graphically displaying a graphical representation of said electronic food menu utilizing a particular language, wherein said output preference for said particular customer designates said particular language.

8. The method for specifying an electronic food menu according to claim 2, said step of graphically displaying said electronic food menu further comprising the step of:

graphically displaying a graphical representation of said electronic food menu wherein prices are displayed in a particular currency, wherein said output preference for said particular customer designates said particular currency.

9. The method for specifying an electronic food menu according to claim 1, said method further comprising the step of:

transmitting auditory output of said electronic food menu for said particular customer.

10. The method for specifying an electronic food menu according to claim 1, said method further comprising the step of:

graphically printing said electronic food menu for said particular customer.

11. The method for specifying an electronic food menu according to claim 1, said method further comprising the step of:

graphically displaying said electronic food menu according to a generic style sheet.

12. The method for specifying an electronic food menu according to claim 1, said step of retrieving food preferences for a particular customer from a universally accessible database, further comprising the step of:

receiving said food preferences from said universally accessible database via a wireless transmission medium.

13. The method for specifying an electronic food menu according to claim 1, said step of retrieving food preferences for a particular customer from a universally accessible database, further comprising the step of:

receiving said food preferences from said universally accessible database via a network transmission medium.

14. The method for specifying an electronic food menu according to claim 1, said step of retrieving food preferences for a particular customer from a universally accessible database, further comprising the step of:

retrieving said food preferences from said universally accessible database wherein said universally accessible database is distributed throughout a remote server system.

15. The method for specifying an electronic food menu according to claim 1, said step of retrieving food preferences for a particular customer from a universally accessible database, further comprising the steps of:

searching said universally accessible database for a customer identification for said particular customer;

comparing said key with an enabling key for said customer identification, in response to locating said customer identification for said particular customer;

enabling the retrieval of said food preferences for said particular customer, in response to a match with said key and said enabling key.

16. The method for specifying an electronic food menu according to claim 13, said step of retrieving food preferences for a particular customer from a universally accessible database, further comprising the step of:

receiving a customer identification and key from a personal integrated circuit device.

17. The method for specifying an electronic food menu according to claim 15, said step of retrieving food preferences for a particular customer from a universally accessible database, further comprising the step of:

receiving a customer identification and key from data entry by said particular customer.

18. The method for specifying an electronic food menu according to claim 1, said step of comparing said food preferences for a particular customer with a plurality of previously stored food menu items, further comprising the step of:

accessing said plurality of previously stored food menu items from a database, wherein each of said plurality of food menu items comprises a plurality of food and health identifiers.

19. The method for specifying an electronic food menu according to claim 1, said method further comprising the step of:

transmitting said previously stored food preferences for said particular customer to said universally accessible database.

20. The method for specifying an electronic food menu according to claim 1, said method further comprising the steps of:

receiving an order from said particular customer for food menu items from said electronic food menu; and transmitting said order to an order retrieval system.

21. The method for specifying an electronic food menu according to claim 20, said method further comprising the steps of:

confirming electronic payment for said order.

22. The method for specifying an electronic food menu according to claim 20, said method further comprising the steps of:

updating an electronic calendar with said food menu items that are specified for a particular time period.

23. The method for specifying an electronic food menu according to claim 1, said method further comprising the step of:

enabling a particular customer to amend said food preferences for said particular customer that are retrievable from said universally accessible database.

24. The method for specifying an electronic food menu according to claim 1, said method further comprising the step of:

designating those food menu items that do not meet said food preferences.

25. The method for specifying an electronic food menu according to claim 1, wherein said previously stored food preferences includes health rating preferences for said particular customer.

26. The method for specifying an electronic food menu according to claim 1, wherein said previously stored food preferences includes attributes of specified allowable ingredients and specified avoided ingredients for said particular customer.

27. A system for specifying an electronic food menu, said system comprising:

a universal communications identification device comprising a plurality of food preferences for a plurality of customers, wherein a key is required to access said food preferences for each of said plurality of customers;

a data processing system with access to said universal communications identification device;

wherein said data processing system comprises:

a communications medium for retrieving food preferences with a key for a particular customer from among said plurality of food preferences for said plurality of customers in said universally accessible database;

means for comparing said food preferences for said particular customer with a plurality of previously stored food menu items;

means for presenting a food menu comprising only a plurality of food menu items that satisfy said food preferences for said particular customer, such that an electronic food menu is specified for said particular customer; and means for graphically displaying said electronic food menu, wherein a plurality of food menu items that do not satisfy said food preferences for said particular customer are graphically distinguishable from said plurality of food menu items that do satisfy said food preferences for said particular customer.

28. The system for specifying an electronic food menu according to claim 27, said system further comprising:

a graphical display monitor for displaying said electronic food menu according to an output preference for said particular customer, such that the graphical representation of said food menu is provided to accommodate a display preference of said particular customer.

29. The system for specifying an electronic food menu according to claim 28, wherein said graphical display monitor only displays said plurality of food menu items of said electronic food menu that are designated.

30. The system for specifying an electronic food menu according to claim 28, wherein said graphical display monitor displays said electronic food menu items in order from designated food menu items to non-designated food menu items.

31. The system for specifying an electronic food menu according to claim 28, wherein said graphical display monitor displays a tactile-detectable graphical representation of said electronic food menu.

32. The system for specifying an electronic food menu according to claim 28, wherein said graphical display monitor displays a graphical representation of said electronic food menu utilizing a particular font size.

33. The system for specifying an electronic food menu according to claim 28, wherein said graphical display monitor displays a graphical representation of said electronic food menu utilizing a particular language.

34. The system for specifying an electronic food menu according to claim 28, wherein said graphical display monitor displays a graphical representation of said electronic food menu wherein said prices are depicted utilizing a particular currency.

35. The system for specifying an electronic food menu according to claim 27, said system further comprising:

an audio element for transmitting auditory output of said electronic food menu for said particular customer.

36. The system for specifying an electronic food menu according to claim 27, said system further comprising:

a printing element for graphically printing said electronic food menu for said particular customer.

37. The system for specifying an electronic food menu according to claim 27, said system further comprising:

a graphical display monitor for displaying a graphical representation of said electronic food menu according to a generic style sheet.

38. The system for specifying an electronic food menu according to claim 27, wherein said means for retrieving a plurality of food menu items from said data storage medium, further comprises:

a wireless communication element for receiving said plurality of food menu items via a wireless transmission medium.

39. The system for specifying an electronic food menu according to claim 27, wherein said means for retrieving a plurality of food menu items from said data storage medium, further comprises:

a network element for receiving said plurality of food menu items via a network connection.

40. The system for specifying an electronic food menu according to claim 27, wherein said means for retrieving a plurality of food menu items from said data storage medium, further comprises:

a socket interface for receiving said plurality of food menu items via a wired connection.

41. The system for specifying an electronic food menu according to claim 27, wherein said data storage medium further comprises:

a plurality of food menu items accessible from a database, wherein each of said plurality of food menu items comprises an item name, a list of at least one ingredient, a price, and a plurality of ratings.

42. The system for specifying an electronic food menu according to claim 27, said system further comprising:

a local data storage medium comprising said previously stored food preferences for said particular customer, wherein said previously stored food preferences for a particular customer comprise a plurality of food ratings.

43. The system for specifying an electronic food menu according to claim 27, said system further comprising:

means for transmitting said previously stored food preferences for said particular customer to said data storage medium.

44. The system for specifying an electronic food menu according to claim 27, said data processing system further comprising:

a local data storage medium for storing said electronic food menu.

45. The system for specifying an electronic food menu according to claim 27, said system further comprising:

a second data processing system for accessing said data storage medium, wherein said data processing system accesses said data storage medium via said second data processing system.

46. The system for specifying an electronic food menu according to claim 27, wherein said data processing system comprises a pervasive data processing system.

47. The system for specifying an electronic food menu according to claim 27, wherein said data processing system comprises a workstation.

48. The system for specifying an electronic food menu according to claim 27, wherein said data processing system transmits an order from said particular customer of food menu items from said electronic food menu.

49. The system for specifying an electronic food menu according to claim 48, wherein said data processing system requests confirmation of an electronic payment for said order.

50. The system for specifying an electronic food menu according to claim 48, wherein said universally accessible database further comprises an electronic calendar for each particular customer that is updated with food menu items that are designated for a particular period of time.

51. The system for specifying an electronic food menu according to claim 27, wherein said data processing system further comprises:

means for comparing said plurality of food menu items with a plurality of previously stored food preferences for a plurality of customers; and means for selecting a food menu wherein said plurality of food menu items that satisfy said previously stored food preferences for said plurality of customers are distinguished, such that an electronic food menu is specified for said plurality of customers.

52. The system for specifying an electronic food menu according to claim 27, said system further comprising:

means for designating those food menu items that do not meet said food preferences.

53. The system for specifying an electronic food menu according to claim 27, wherein said previously stored food preferences includes health rating preferences for said particular customer.

54. The system for specifying an electronic food menu according to claim 27, wherein said previously stored food preferences includes attributes of specified allowable ingredients and specified avoided ingredients for said particular customer.

55. A program, residing on a computer usable medium having computer readable program code means, said program comprising:

means for retrieving food preferences with a key for a particular customer from among said plurality of food preferences for said plurality of customers in said universally accessible database;

means for comparing said food preferences for said particular customer with a plurality of previously stored food menu items;

means for generating an electronic food menu comprising said plurality of food menu items that satisfy said food preferences for said particular customer, such that an electronic food menu is specified for said particular customer; and means for graphically displaying said electronic food menu, wherein a plurality of food menu items that do not satisfy said food preferences for said particular customer are graphically distinguishable from said plurality of food menu items that do satisfy said food preferences for said particular customer.

56. The program according to claim 55, said program further comprising:

means for enabling a graphical display of said plurality of food menu items, wherein said plurality of food menu items that do not satisfy said preferences are graphically designated.

57. The program according to claim 55, said program further comprising:

means for enabling said graphical display of said generated food menu according to an output preference for said particular customer.

58. The program according to claim 55, said program further comprising:

means for enabling auditory output of said generated food menu for said particular customer.

59. The program according to claim 55, said program further comprising:

means for enabling tactile-detectable output of said generated food menu for said particular customer.

60. The program according to claim 55, said program further comprising:

means for transmitting said food preferences for said particular customer to said data storage medium.

61. The program according to claim 55, said program further comprising:

means for receiving an order from said particular customer of electronic food menu items from among said electronic food menu; and means for transmitting said order to an order retrieval system.

62. The program according to claim 55, said program further comprising:

means for designating those food menu items that do not meet said food preferences.

63. The program according to claim 55, wherein said previously stored food preferences includes health rating preferences for said particular customer.

64. The program according to claim 51, wherein said previously stored food preferences includes attributes of specified allowable ingredients and specified avoided ingredients for said particular customer.

65. A method for specifying an electronic food menu, said method comprising the steps of:

retrieving a plurality of food menu items from a data storage medium;

comparing said plurality of food menu items with previously stored food preferences for a particular customer; and presenting a food menu, wherein a plurality of food menu items that are indicated to be avoided by said previously stored food preferences for said particular customer are presented in said food menu and are designated in a manner to distinguish from other food menu items presented in said food menu, such that a customized electronic food menu is specified for a particular customer.

66. A system for specifying an electronic food menu, said system comprising:

a data storage medium comprising a plurality of food menu items;

a data processing system with access to said data storage medium;

wherein said data processing system comprises:

a communications medium for retrieving said plurality of food menu items from said data storage medium;

means for comparing said plurality of food menu items with a plurality of previously stored food preferences for a particular customer; and means for presenting a food menu, wherein a plurality of food menu items that are indicated to be avoided by said previously stored food preferences for said particular customer are presented in said food menu and are designated in a manner to distinguish from other food menu items presented in said food menu, such that a customized electronic food menu is specified for a particular customer.

67. A program, residing on a computer usable medium having computer readable program code means, said program comprising:

means for retrieving a plurality of food menu items from a data storage medium;

means for comparing said plurality of food menu items with previously stored food preferences for a particular customer; and means for generating a food menu presenting a selection of said plurality of food menu items indicated to be avoided by said previously stored food preferences for said particular customer, and a selection of said plurality of food menu items not indicated to be avoided by said previously stored food preferences for said particular customer, wherein said selection of said plurality of food menu items indicated to be avoided is designated in a manner to distinguish from said selection of said plurality of food menu items not indicated to be avoided by said previously stored food preferences for said particular customer.

* * * * *